F. Hoguet,
Extension Table,
Nº 7,954. Patented Feb. 25, 1851.
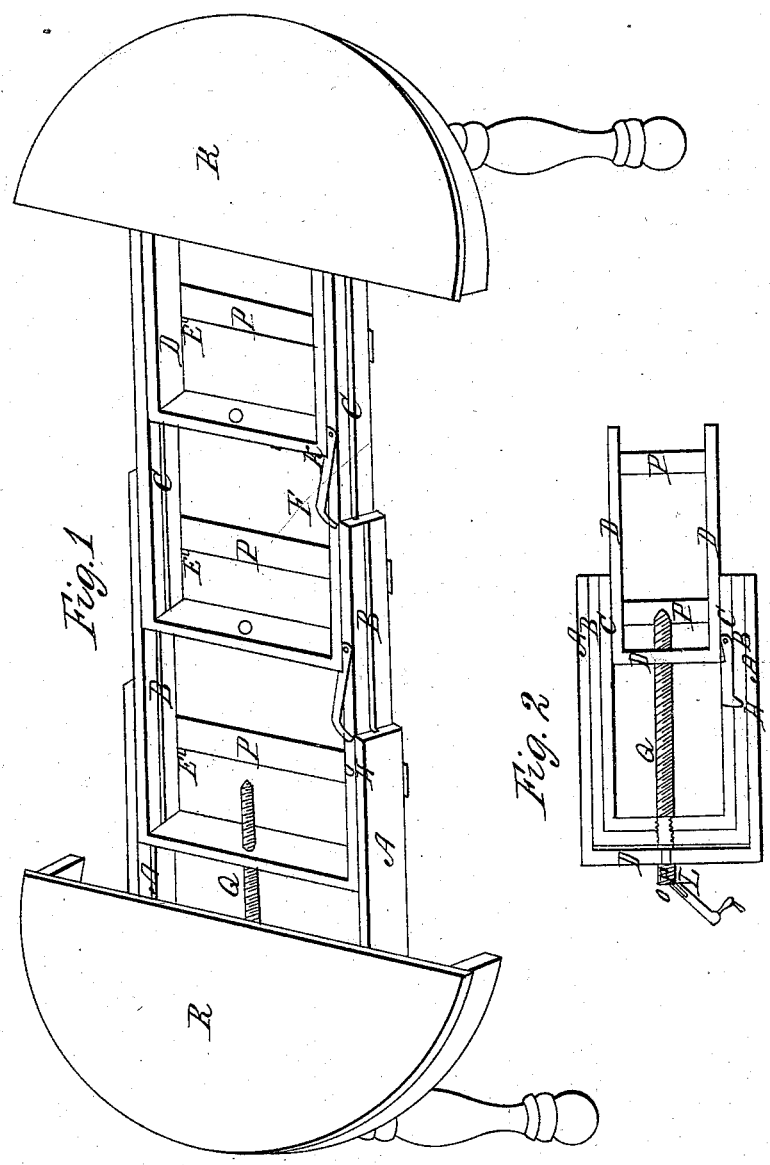

UNITED STATES PATENT OFFICE.

FRANCIS HOGUET, OF PHILADELPHIA, PENNSYLVANIA.

EXTENSION-TABLE.

Specification of Letters Patent No. 7,954, dated February 25, 1851.

*To all whom it may concern:*

Be it known that I, FRANCIS HOGUET, of the city of Philadelphia, in the county of Philadelphia and State of Pennsylvania, have invented certain new and useful Improvements in Extension-Tables; and I do hereby declare that the following is a full and exact description thereof.

To enable others skilled in the art to make and use my invention I will proceed to describe the construction and operation of the same.

In the accompanying drawings, which form a part of this specification, Figure 1 is a perspective view. A, B, C, D slides. F catches for holding the slides in their proper places when the table is extended, E pins in the underside of the slides, which pins come in contact with the ties P. P ties fastened to the ends of the slides, which ties are for the purpose of holding the outside slides firm against the inner ones. R end leaves.

Fig. 2 horizontal section. A, B, C, D, slides. P ties. Q screw. L crank shaft having a slot which will slide on a pin in the end of the screw Q.

By raising the shaft L to a line with the screw and shoving the shaft in on the pin, the end of the shaft enters the screw and the crank is held sufficiently firm to turn the screw; and when the table is closed up by hauling the crank out it can be turned in under the leaf R out of the way. The slides D are narrower than C, C narrower than B, and B narrower than A, so that the ties P can slide under each other. The slides A are fastened to one end of the table and the slides D to the opposite end. The thread is cut off the screw at the end next the crank so as to allow the end pieces of C and B to move back off the thread.

When I wish to extend the table I raise the crank as before specified, then turn the screw backward which slides out D, and the pins E coming in contact with the tie P of C, hauls C on the screw which being run out in the same manner hauls out B. As the slides are run out the hooked catches F catch against the corners of the slides which prevents the slide which has been run out from being closed up as the next slides are run out. When I wish to close the table up I turn the screw forward and as the hook F on slide B arrives at a notch which is in A under the leaf R the point of F drops in the notch and allows the slide C to come up in the same manner, the hook F dropping into the notch H in rail B. The loose leaves to fill up the space between the end leaves R, are made in the usual form and must be removed before the table can be closed up.

Now it will be observed that by making the different pairs of slides of different width I can put ties across the ends of the slides which could not be done if the slides were run out by means of racks and pinions and by using a screw for the purpose of moving the slides out and in it only requires a screw of sufficient length to move out one slide, to move any number that may be desired.

Having thus fully described the construction and operation of my improvement in extension tables, what I claim therein as new and of my invention and desire to secure by Letters Patent is:

The arrangement of a screw or other equivalent device in combination with the slides in such a manner, that a screw or its equivalent of sufficient length to move out one pair of slides, will move out any number desired, substantially in the manner and for the purpose set forth.

FRANCIS HOGUET.

Witnesses:
 WM. BULLOCK,
 I. B. MURPHY.